United States Patent
Tietje

(10) Patent No.: US 7,588,281 B2
(45) Date of Patent: Sep. 15, 2009

(54) MANUFACTURING SYSTEM AND COMPONENT FOR FIRST AND SECOND GROUPS OF VEHICLES

(75) Inventor: Peter Tietje, Fahrenzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/970,849

(22) Filed: Jan. 8, 2008

(65) Prior Publication Data
US 2008/0169669 A1  Jul. 17, 2008

Related U.S. Application Data

(63) Continuation of application No. PCT/EP2006/006363, filed on Jun. 30, 2006.

(30) Foreign Application Priority Data
Jul. 9, 2005 (DE) .................. 10 2005 032 180

(51) Int. Cl.
*B60N 2/00* (2006.01)
(52) U.S. Cl. ........................................ 296/63
(58) Field of Classification Search ... 296/65.01–65.15, 296/63; 297/130, 337, 338
See application file for complete search history.

(56) References Cited

U.S. PATENT DOCUMENTS 2,660,223 A * 11/1953 Appleton .................. 297/344.1
6,099,039 A * 8/2000 Hine ........................... 280/781
6,357,811 B1 * 3/2002 Nakamura et al. ............ 296/29
6,375,247 B1   4/2002 Volz et al.
2001/0030440 A1 * 10/2001 Ney ........................ 296/65.15

FOREIGN PATENT DOCUMENTS

| DE | 958 361 B | 2/1957 |
| DE | 100 18 407 A1 | 11/2001 |
| EP | 1 297 996 B1 | 4/2003 |
| GB | 887960 | 1/1962 |
| JP | 2000-255289 A | 9/2000 |
| WO | WO 2006/053657 A1 | 5/2006 |

OTHER PUBLICATIONS

International Search Report dated Nov. 21, 2006 with an English translation of the pertinent portions (Five (5) pages).
German Search Report dated Mar. 8, 2006 with an English translation of the pertinent portions (Nine (9) pages).

* cited by examiner

*Primary Examiner*—Dennis H Pedder
*Assistant Examiner*—Pinel E Romain
(74) *Attorney, Agent, or Firm*—Crowell & Moring LLP

(57) ABSTRACT

In order to be able to use a uniform body structure in the case of vehicles in a model series of a vehicle manufacturer whose rear seats are equipped either with a stationary seat cushion or with an adjustable seat cushion, in the area of the floor panel, an adapter is provided between the top side of the floor panel and the underside of the seat cushion. The adapter compensates for different height levels and/or different geometrical designs of the two variants of the seat cushions.

12 Claims, 1 Drawing Sheet

MANUFACTURING SYSTEM AND COMPONENT FOR FIRST AND SECOND GROUPS OF VEHICLES

CROSS-REFERENCE TO RELATED APPLICATIONS

This application is a continuation of PCT International Application No. PCT/EP2006/006363, filed on Jun. 30, 2006, which claims priority under 35 U.S.C. §119 to German Application No. 10 2005 032 180.1, filed Jul. 9, 2005, the entire disclosures of which are expressly incorporated by reference herein.

BACKGROUND AND SUMMARY OF THE INVENTION

The invention relates to a first and a second group of vehicles, wherein the vehicles have essentially the same construction and have at least one rear seat arranged on a floor panel of the vehicle. The rear seat of the first group of vehicles has a stationary seat cushion and the rear seat of the second group of vehicles has an adjustable seat cushion.

Vehicles in a vehicle manufacturer's model series are typically offered in different equipment-related configurations, wherein certain equipment-related variations require adaptations to the body structure of the vehicle body. For implementing rear seats with a longitudinal and/or height adjustment of the seat cushion, as a rule, some measures affecting the body structure are required, in contrast to vehicles with stationary seat cushions. As a result of these body structure variations, high costs arise for the different tools used to produce the various underbodies of the vehicles. In addition, the logistic expenditures for the control of the body structure variations are considerable.

It is an object of the invention to avoid the known disadvantages in the case of a vehicle series having differently constructed rear seats.

This object is achieved by providing vehicles characterized in that two groups of vehicles have floor panels of the same construction, and, for compensating the different further developments of the rear seats, in at least one group of vehicles, an adapter is arranged between a top side of the floor panel and an underside of the seat cushion.

According to the invention, a uniform body structure is used for the different constructions of the rear seats instead of an additional body structure variant. The invention compensates for the different seat cushions and/or their different connection to the body structure by way of an additional part, i.e., an adapter that is independent of the body structure. The adapter mainly functions to achieve height compensation because rear seats with an adjusting possibility require more space below the seat cushion than stationary rear seats. However, the adapter can also be used for compensating different geometrical further developments on the underside of rear seats.

With the reduction to one body structure variant, a considerable potential for cost savings arises. As a result of the elimination of the different tools and the simplified logic when manufacturing the vehicle body structure, considerable savings become possible such that a clear cost advantage occurs despite the additional costs for the adapter.

Naturally, the invention analogously includes also more than two groups of vehicles if the vehicle manufacturer offers more than two rear seat variations for the corresponding vehicle series.

Although a vehicle body for a motor vehicle is known from Japanese patent document JP 2000255289 A1, which has seat buckets for a rear seat arranged behind one another, these seat buckets cannot be occupied by adapters of a different design, but rather are intended for the optional insertion of one and the same rear seat either into the forward or into the rearward bucket. In contrast, the invention relates to rear seats with a longitudinal and/or height adjustment of the seat cushion for comfort purposes. However, the seat cushion cannot be removed as a whole or be changed into a different usage position by swiveling, folding down, or the like.

The adapter may be constructed as a piece part which, on one side, is connected with the floor panel of the vehicle body and, on the other side, with the rear seat. As an alternative, the adapter may be constructed as a constructional unit together with the seat cushion. In the case of this embodiment, the cover of the seat cushion preferably extends also over the adapter and is fastened to the latter. As a result, the seat cushion can be installed together with the adapter as an integrated upholstery part.

The adapter may be made of sheet steel by means of deep-drawing. As an alternative, the adapter may consist of aluminum, of another light-metal material, or of a plastic material. The adapter may have the shape of a trough or may be constructed as a volume component, for example, as a rigid-foam part. The adapter may also consist of a combination of different materials.

Other objects, advantages and novel features of the present invention will become apparent from the following detailed description of the invention when considered in conjunction with the accompanying drawings.

DETAILED DESCRIPTION OF THE DRAWINGS

Figure 1:
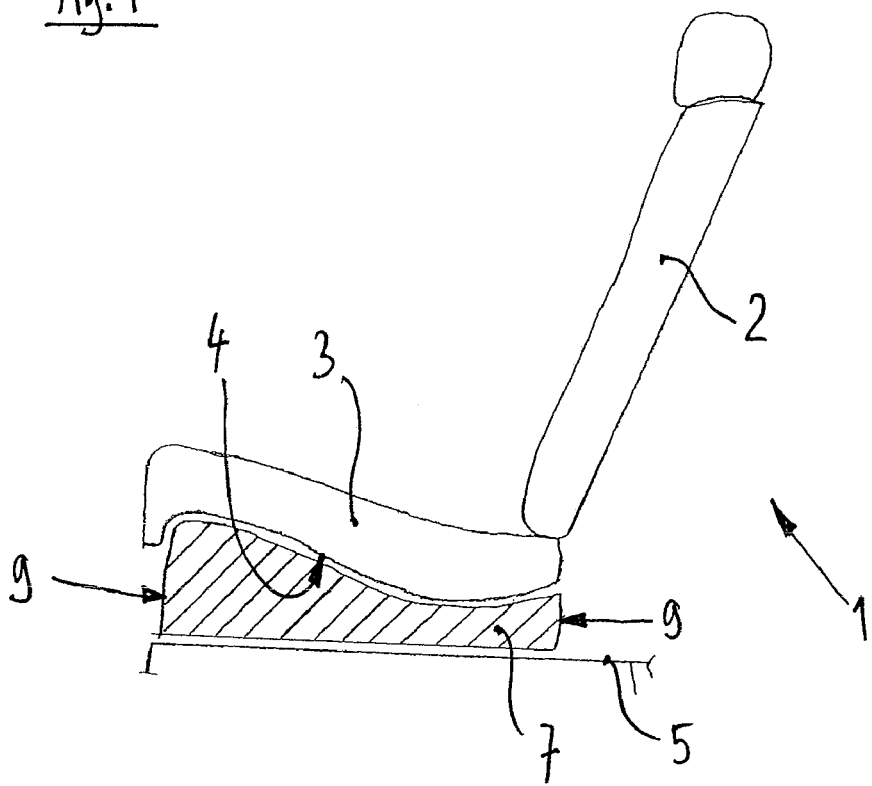
FIG. 1 is an illustration of a first embodiment of the invention.

A rear seat of a motor vehicle which, as a whole, has the reference number 1, includes a backrest 2 as well as a seat cushion 3. In the longitudinal view, the underside 4 of the seat cushion 3 has a curved course.

The rear seat 1 is arranged above a floor panel 5 of the vehicle body. According to the invention, an adapter 7 is provided between the underside 4 of the seat cushion 3 and the top side 6 of the floor panel 5.

Figure 2:
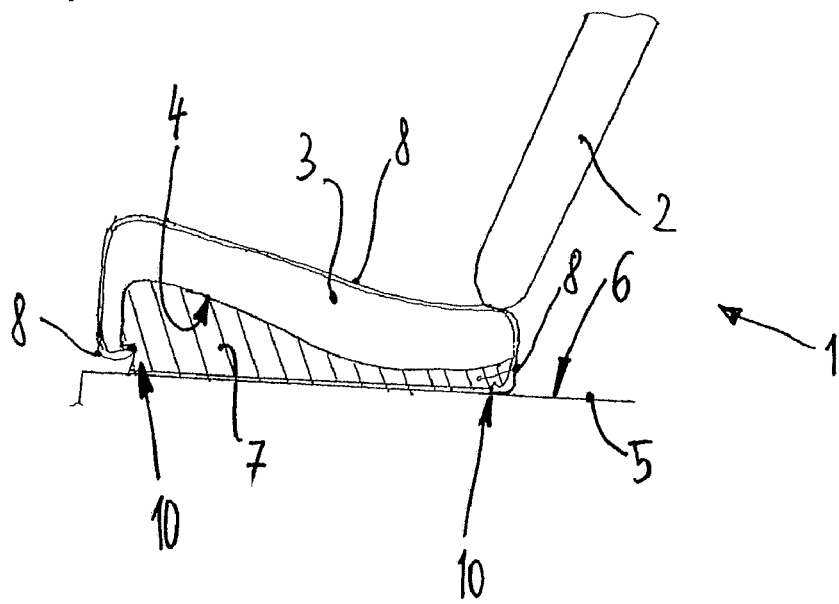
FIG. 2 is an illustration of a second embodiment of the invention.

In the present embodiments, the adapters adapts or compensates for different height connection levels of different rear seats 1. These different levels are caused by the fact that different equipment variations of rear seats 1 are installed within a vehicle model series of a vehicle manufacturer. Thus, particularly at present in the upper vehicle classes, rear seats 1 are offered whose seat cushions 3 are adjustable in the longitudinal direction and/or in the vertical direction. As a result, similar to what is generally customary in the case of motor vehicle front seats, an adaptation to different body sizes, body shapes, and sitting habits of occupants is achieved with respect to increasing a person's sitting comfort. Since the adjustable seat cushions 3 of the rear seats represent comparatively expensive equipment, this is offered only as special equipment—except in vehicles of the luxury class. In order to be able to manufacture within one vehicle series a uniform body structure with a uniform level of the floor panel, on the one hand, in the case of vehicles with a adjustable seat cushions and, on the other hand, in the case of vehicles without adjustable seat cushions, the adapter 7 is provided for compensating different levels and/or different component geometries. The adapter 7 is used in the case of those rear seats 1 which are not vertically and/or longitudinally adjustable and thus require a smaller "substructure" than the adjustable rear seats 1. FIGS. 1 and 2 therefore show such stationary rear seats 1 without an adjusting mechanism and with an adapter 7.

In the case of rear seats 1 with an adjusting possibility, the adapter 7 is replaced by an adjusting mechanism (not shown), which is placed on the essentially plane top side 6 of the floor panel 5.

FIGS. 1 and 2 illustrate adapters 7 having different heights for different vehicle constructions within a vehicle model series, such as for a sedan, coupe, or a combined construction, where a uniform floor panel 5 is used but different variants of rear seats 1 and/or different adjusting mechanisms are provided. The different heights of the adapters 7 is mainly determined by the type of the adjusting mechanism and the extent of the adjusting possibilities.

In addition to height compensation (or instead of the height compensation), the adapters 7 may function to compensate different geometrical shapes which, depending on the construction of the rear seat 1, exist on the underside 4 of the seat cushions 3.

The adapters 7 illustrated in FIGS. 1 and 2 are connected to the pertaining seat cushions 3 in various fashions. According to FIG. 1, the adapter 7 is constructed as a separate component which, on the one side, is connected with the top side 6 of the floor panel 5 and, on the other side, is connected with the underside 4 of the seat cushion 3. In contrast, the adapter 7 according to FIG. 2 forms a constructional unit with the seat cushion 3 of the rear seat 1, the cover 8 of the seat cushion 3 also covering sections of the adapter 7, such as the forward and rearward faces 9 of the seat cushion 3. The lateral faces of the adapter 7 (not visible in FIG. 2) are also covered by the cover 8. By use of fastening devices 10, the cover 8 is fastened on the forward face 9 and on the underside of the adapter 7 to this adapter 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for use with a vehicle manufacturer's model series, which model series includes first and second groups of vehicles, the groups of vehicles having substantially the same construction and each vehicle having at least one rear seat arrangeable on a floor panel of the vehicle, wherein the rear seat of the first group of vehicles has a stationary seat cushion and the rear seat of the second group of vehicles has an adjustable seat cushion, the apparatus comprising:

an adapter configured to be operatively arrangeable on a top side of a floor panel of the first group of vehicles, which floor panel of the first and second group of vehicles has the same construction, and on an underside of the stationary seat cushion of the first group of vehicles, wherein the adapter compensates for differing rear seat constructions between the groups of vehicles.

2. The apparatus according to claim 1, further comprising the stationary seat cushion, wherein the adapter and the stationery seat cushion are operatively configured as a constructional unit.

3. The apparatus according to claim 1, wherein the adapter is operatively constructed as a separate component from the seat cushion.

4. The apparatus according to claim 1, further comprising a cover of the stationary seat cushion, wherein the cover comprises a section operatively configured to cover at least partial lateral areas of the adapter, the cover being fastened to the adapter.

5. The apparatus according to claim 2, further comprising a cover for the seat cushion, the cover comprising at least one section operatively configured to cover at least partial lateral areas of the adapter and being fastened to the adapter.

6. A vehicle manufacturing system, comprising:

a vehicle manufacturer's model series having at least first and second groups of vehicles, said first and second groups of vehicles having substantially a same construction and having at least one rear seat arranged on a floor panel of each vehicle, the rear seat of a first group of vehicles having a stationary seat cushion and a rear seat of the second group of vehicles having an adjustable seat cushion;

wherein the floor panels of the at least first and second groups of vehicles have an identical construction, at least in areas wherein the rear seat is to be installed;

an adapter operatively configured to be arranged between a top side of the floor panel and an underside of the stationary seat cushion, the adapter being utilized with the first group of vehicles having the stationery seat cushion, wherein the adapter is further operatively configured to compensate for differing variations of the rear seats in at least one of the group of vehicles.

7. The system according to claim 6, wherein the stationary seat cushion and the adapter are constructed as an integrated unit prior to installation on the floor panel.

8. The system according to claim 6, further comprising a seat cushion cover having at least one section operatively configured to cover at least partially lateral areas of the adapter, the section being fastened to the adapter.

9. A seat configuration assembled in a vehicle manufacturing system for first and second groups of vehicles, the groups of vehicles having floor panels with substantially the same construction, the seat configuration comprising:

each vehicle having at least one rear seat arrangeable on the floor panel of the vehicle, wherein the rear seat of the first group of vehicles has a stationary seat cushion and the rear seat of the second group of vehicles has an adjustable seat cushion;

an adapter configured to be operatively arrangeable on a top side of the floor panel of the first group of vehicles and on an underside of the stationary seat cushion of the first group of vehicles, wherein the adapter compensates for differing rear seat constructions between the groups of vehicles.

10. The seat configuration according to claim 9, wherein the adapter and the stationery seat cushion are operatively configured as a constructional unit.

11. The seat configuration according to claim 9, wherein the adapter is operatively constructed as a separate component from the stationary seat cushion.

12. The seat configuration according to claim 9, further comprising a cover for the stationary seat cushion, wherein the cover comprises a section operatively configured to cover at least partial lateral areas of the adapter, the cover being fastened to the adapter.

* * * * *